United States Patent
Wissmann

[11] 3,797,637
[45] Mar. 19, 1974

[54] RECIPROCATING CONVEYORS

[76] Inventor: Ing Kurt Wissmann, 406 Vios-in Finchliln Mishlenhenwig:25, Muhlenheuweg, Germany

[22] Filed: Dec. 28, 1971

[21] Appl. No.: 213,226

[52] U.S. Cl. ............................................. 198/221
[51] Int. Cl. ........................................... B65g 25/08
[58] Field of Search .................................... 198/221

[56] References Cited
UNITED STATES PATENTS
| | | | |
|---|---|---|---|
| 2,392,340 | 1/1946 | Smith | 198/221 X |
| 3,158,257 | 11/1964 | Peras | 198/221 |
| 3,659,702 | 5/1972 | Assauer | 198/221 |

FOREIGN PATENTS OR APPLICATIONS
| | | | |
|---|---|---|---|
| 890,408 | 1/1943 | France | 198/221 |
| 1,552,972 | 10/1967 | France | 198/221 |
| 1,212,868 | 3/1966 | Germany | 198/221 |

*Primary Examiner*—Evon C. Blunk
*Assistant Examiner*—W. Scott Carson
*Attorney, Agent, or Firm*—Meyer, Tilberry & Body

[57] ABSTRACT

To overcome the problems associated with conveying metal chip, especially cast-iron chip, the reciprocating conveyor is provided with means whereby, on the return stroke of the conveying rod, a free passage, effective more particularly for fine chip, is left between the entraining means.

4 Claims, 6 Drawing Figures

RECIPROCATING CONVEYORS

BACKGROUND OF THE INVENTION

This invention relates to a bulk conveyor more particularly for metal chip and similar scrap.

It has been found that metal chip or swarf and similar scrap can be satisfactorily conveyed by means of very simply constructed conveyors in which a conveyor rod having entraining means reciprocates along the bottom of a trough. On their operative stroke, the entraining means, which are in plan substantially V-shaped, push the material before them, and on their return stroke they thrust the material laterally and backwards.

It has been found by long experience that fine chip — i.e., mainly cast-iron chip — may cause difficulties in such conveyors if the fine chip forms all or a large proportion of the total scrap. Cast-iron chip behaves very differently from other metal chip when being conveyed. Woolly, loose and similar chip is fairly easy to push back and to the side, having some degree of elasticity, but accumulations of cast-iron chip tend to consolidate when pressed and to present solid walls or layers to the moving entraining means and thus jam the conveyor.

SUMMARY OF THE INVENTION

It is an object of the invention to enable conveyors of the kind specified to be used satisfactorily for the conveyance of fine chip — i.e., cast-iron chip. It is another object of the invention to enable conveyors suitable for cast-iron chips to deal satisfactorily too with the various other form of chip, for example loose and woolly chip, whether mixed or separately. According to the invention, therefore, on the return stroke of the conveyor rod a free passage, effective more particularly for fine chip, is left between the entraining means. Advantageously, the passage extends below the centre of the conveyor rod right down to or near to the trough base.

There is, therefore, a kind of valve action as the conveyor rod reciprocates. On the return movement of the rod the chip can readily enter the V-space and the same remains open, whereas on the operative or conveying stroke compression of the chip in the V-space, which is now narrowing as far as the chip is concerned, means that such space closes. The chip starts to back up and bridge as in a narrowing bunker exit. The chip in the V-space is, therefore, prevented from passing through the passage and is, therefore, entrained in the direction of the conveying stroke of the rod as though the passage was being kept closed like a valve.

When the conveying rod changes over to its return movement, the back up and the bridging are cancelled by friction on the base in association with the expanding V-shaped space, so that the passage reopens and the chips can pass therethrough into the V-shaped space.

Advantageously, for transfer of the chip on the return stroke into the expanding V-shaped space bounded by the entraining means, the edges thereof are inclined. This feature facilitates transfer of the chip into the V-shaped space and opposes chip consolidation, the chip being loosened, for example by being raised, as it goes between the entraining means into the free V-shaped space which is expanding against the direction of movement. The chip, therefore, changes over very rapidly from a state of incipient consolidation into a state suitable for trickling — that is to some extent from a quasi-solid into a quasi-liquid state. The chip in the V-shaped space is, therefore, prevented from discharging through the passage and is, therefore, entrained on the conveying stroke as though the passage was being kept closed by a valve.

When the rod changes over to the return movement, friction against the base together with the increasing size of the V-shaped space obviates back up and bridging, and so the passage reopens and the chip can trickle therethrough.

One way of increasing the efficiency of the novel system is to increase the number of entraining means engaging in a conveying cross-section, preferably by increasing the entraining means to two pairs of such means so that each of the gaps which such pairs bound and which expand in the direction of conveyance is associated with a rearward passage, the inner pair being less inclined to the conveying rod or centre-plane of the trough than the outer pair.

It is important for the passage to be present in the bottom part of the trough — i.e., beside and below the conveying rod, so that on the return stroke the fine chip at the bottom of the trough can enter the widening gap. For the same reason, the inclined edges of the entraining means extend rearwardly to near the trough base.

Further advantages in the manufacture of the entraining means are provided if the same are devised as triangles, which can be cut from strips of metal of a width approximately equal to the height of the triangles, the same being cut alternately with the apex pointing in the opposite direction, wastage being very reduced.

A considerable advantage is that the effects described are achieved without moving entraining means or flaps or the like; there is nothing against the use of hinged entraining means — for instance, if there is going to be very thorough servicing — although general experience is that even after a relatively short period of operation the chip jams the pivots, whereafter the entraining means function as rigid elements anyway.

BRIEF DESCRIPTION OF THE DRAWING

For a better understanding of the present invention and to show how the same may be carried into effect, reference will now be made, by way of example, to the accompanying drawings, in which.

DESCRIPTION OF PREFERRED EMBODIMENTS

Figure 1:
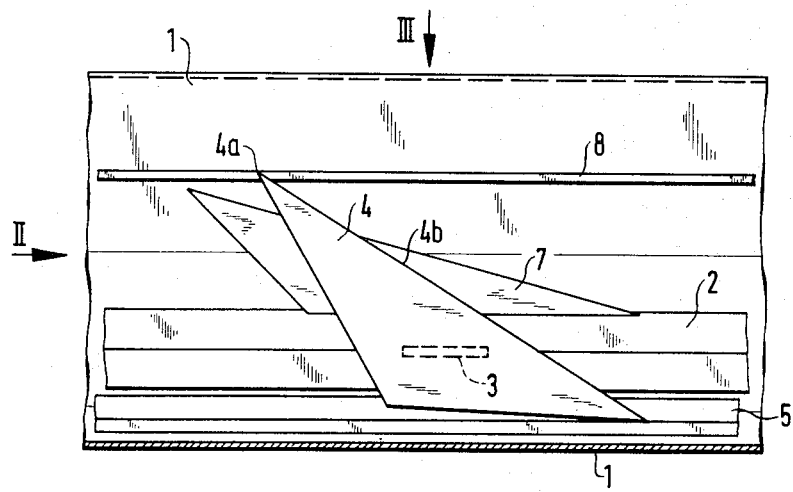
FIG. 1 shows a side elevational view of a conveyor rod having two entraining means, each in one conveying cross-section.
Figure 2:
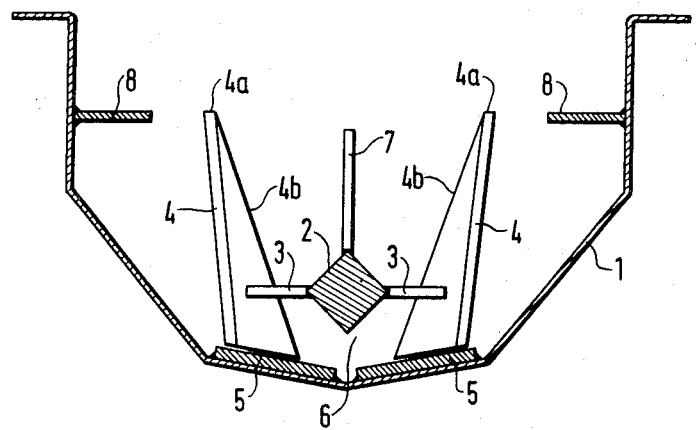
FIG. 2 shows a front elevation of the conveyor rod of FIG. 1.
Figure 3:
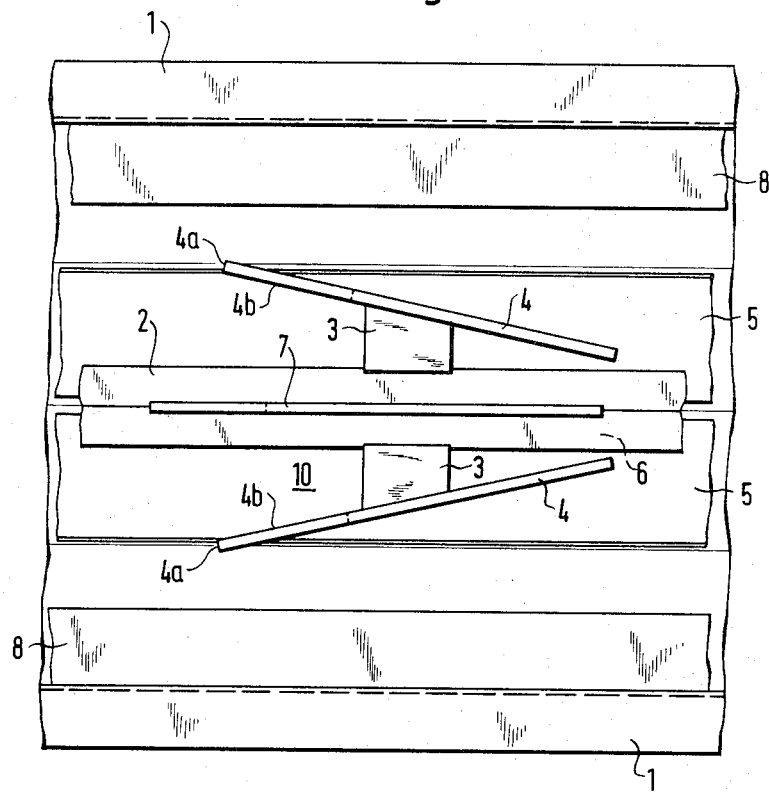
FIG. 3 shows a plan view of the conveyor rod of FIGS. 1 and 2, and FIGS. 4 to 6 show views corresponding to those of FIGS. 1 to 3 of a conveyor rod having paired entraining means.

Referring now to FIGS. 1 to 3 of the drawing, as is conventional in conveyors of this kind, a conveyor rod 2 is reciprocable along the bottom of a trough 1. Entraining means 4 are secured to the conveyor rod 2 by webs 3; the entrainment means 4 are in shape triangular with their apex 4a pointing forwardly and upwardly. Rear edge 4b descends as far as the trough base or as far as trough wearing lining 5. A passage 6 remains between the means 4 at the rearward end thereof. Pins 7 on the conveyor rod 2 and guards 8 on the wall of trough 1 complete the equipment.

Referring to the plan view of FIG. 3, a V-shaped space 10 between the two means 4 of any conveying cross-section narrows for chips entering on the conveying stroke and expands for chip which trickles in through the passage 6 on the return stroke and which spills over the top of the edges 4b.

Figure 4:
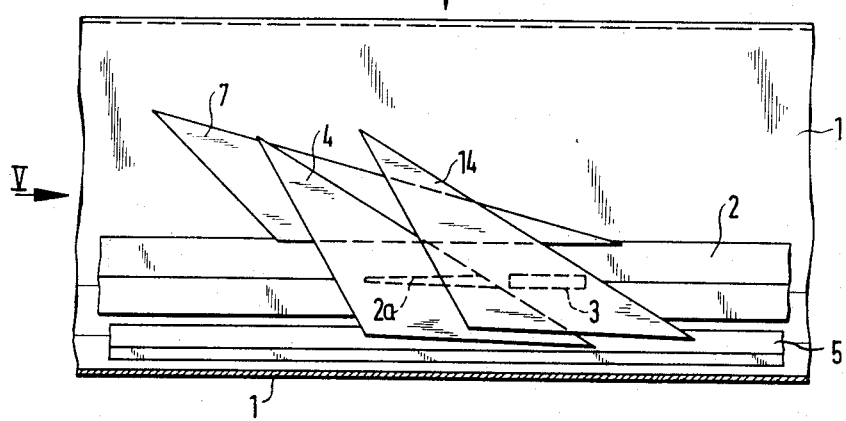
Figure 5:
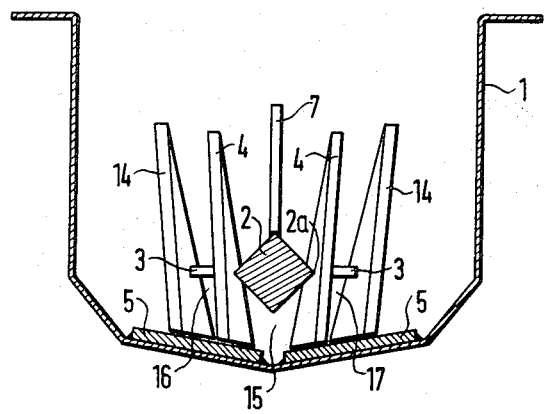
Figure 6:
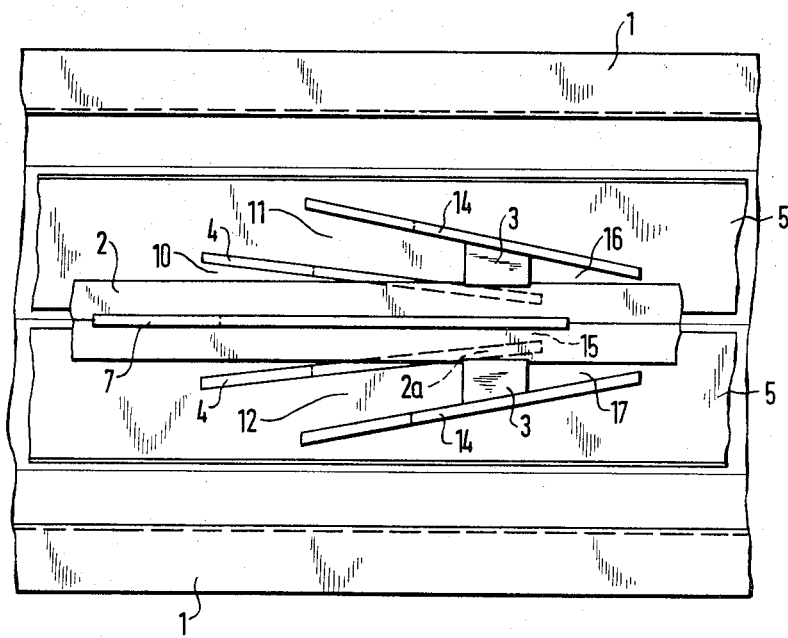

In the second embodiment shown in FIGS. 4 to 6 of the drawing, two pairs of entraining means 4, 14 are secured to the conveyor rod 2; the inner pair can be directly welded to rod 2 at a place 2a. The entraining means bound expanding and/or narrowing spaces 10, 11 and 12 which terminate in free passages 15, 16 and 17.

The embodiment shown in FIGS. 1 to 3 is of use for fine chip, cast-iron or the like, for other kinds of chip and for chip mixtures.

Very advantageously, the conveying rod, instead of being associated with fixed guides, is so mounted as to be free to move in the trough with the entraining members resting on it, so that the same can adjust themselves to suit existing resistancies.

Preferably, the conveying rod has a cross-section which is closed at the bottom (square, round bar section), so that chip cannot collect in the hollow interior of the rod and cause the same to move upwards.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. In a bulk conveyor including a conveyor trough having a bottom, a conveyor rod reciprocable longitudinally along said trough and being located above the bottom of the trough, said rod being reciprocable in a forward feeding direction and a rearward retracting direction, entraining means attached to said rod for feeding material along said trough during movement of said rod in said forward feeding direction, said entraining means being substantially V-shaped in plan view and having a base facing in said rearward retracting direction, said entraining means including a free passage at said base thereof which passage extends beside and below the center of said rod to said bottom of said trough.

2. A conveyor including an elongated trough having a bottom, a conveyor rod reciprocable longitudinally along said trough in a forward feeding direction and a rearward retracting direction, entraining means attached to said rod for feeding material along said trough during movement of said rod in said forward feeding direction; said entraining means being substantially V-shaped in plan view and having a free passage therethrough adjacent said bottom of said trough, said entraining means including a pair of plate members, each plate member having (a) a triangular peripheral shape, (b) a bottom edge including a forward end and a rear end, (c) a front edge sloping upwardly and forwardly from said forward end, and (d) a trailing edge sloping upwardly and forwardly from said rear end to intersect said front edge whereby said entraining means provides inner feeding surfaces facing said forward feeding direction and sloping toward said passage for feeding material toward said passage during movement of said rod in said forward feeding direction and outer deflecting surfaces facing said rearward retracting direction and sloping away from said passage for deflecting material away from said passage during movement of said rod in said rearward retracting direction.

3. The device of claim 2 wherein there are a plurality of said passages.

4. The device of claim 2 wherein said bottom edges slope upwardly toward said forward feeding direction from said passage.

* * * * *

UNITED STATES PATENT OFFICE
CERTIFICATE OF CORRECTION

Patent No. 3,797,637        Dated March 19, 1974

Inventor(s) Dr. Ing Kurt Wissmann

It is certified that error appears in the above-identified patent and that said Letters Patent are hereby corrected as shown below:

Cover page, first column, correct the inventor's name and address by deleting "Ing Kurt Wissmann, 406 Vios-in Finchliln Mishlenhenwig:25, Muhlenheuweg, Germany"

and substitute therefor

--- Dr. Ing. Kurt Wissmann

4053 Suchteln-Hagenbroich

Muhlenheuweg 25

Federal Republic of Germany ---

Signed and sealed this 29th day of October 1974.

(SEAL)
Attest:

McCOY M. GIBSON JR.           C. MARSHALL DANN
Attesting Officer              Commissioner of Patents